United States Patent [19]

Gassaway et al.

[11] 4,306,708

[45] Dec. 22, 1981

[54] MEANS FOR ESTABLISHING A SUPPORT POST FOR A GROMMET

[75] Inventors: William B. Gassaway; John R. Wike, both of Memphis, Tenn.

[73] Assignee: Tennessee Bolt and Screw Co., Inc., Memphis, Tenn.

[21] Appl. No.: 38,432

[22] Filed: May 14, 1979

[51] Int. Cl.³ .............................................. F16M 11/00
[52] U.S. Cl. ................. 267/141.3; 248/544; 248/635
[58] Field of Search ......... 248/544, 632, 635; 85/1 JP, 70; 151/37; 267/141.2, 141.3

[56] References Cited

U.S. PATENT DOCUMENTS

| | | | |
|---|---|---|---|
| 1,855,769 | 4/1932 | Paton | 248/635 |
| 2,115,653 | 4/1938 | Snyder | 248/635 |
| 2,208,532 | 7/1940 | Woodward | 85/70 X |
| 2,520,757 | 8/1950 | Cain | 248/632 |
| 3,138,358 | 6/1964 | Comstock et al. | 248/635 |
| 3,301,121 | 1/1967 | Newcomer | 85/70 X |
| 3,687,404 | 8/1972 | Werner | 248/544 |

FOREIGN PATENT DOCUMENTS

| | | | |
|---|---|---|---|
| 776990 | 6/1957 | United Kingdom | 267/141.3 |
| 872770 | 7/1961 | United Kingdom | 248/632 |

*Primary Examiner*—William H. Schultz
*Attorney, Agent, or Firm*—Walker & McKenzie

[57] ABSTRACT

A sub-assembly comprising a bolt/screw member and a spacer sleeve member which jointly resemble a shoulder bolt/screw. The sub-assembly is particularly beneficial to act as a mount point or support for a rubber or synthetic grommet which in turn can support air compressor or motor power units used in various appliances, e.g., washers, dryers, refrigerators, and air-conditioners.

6 Claims, 8 Drawing Figures

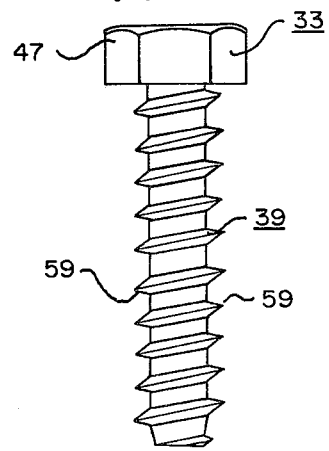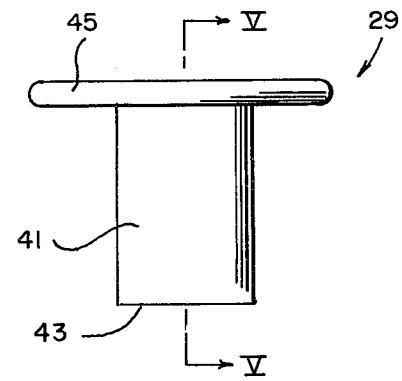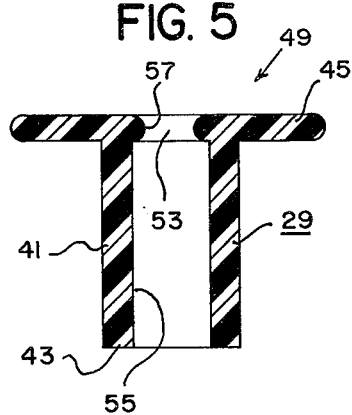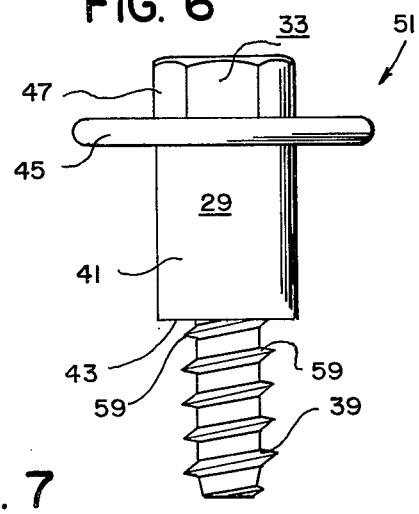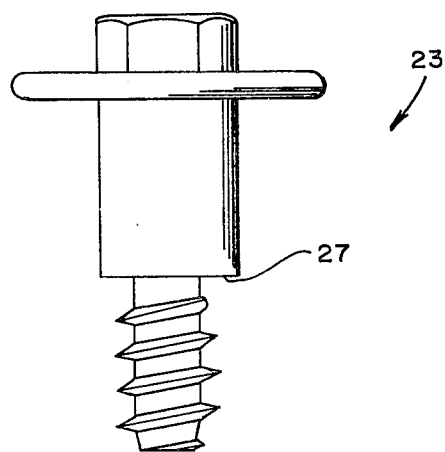

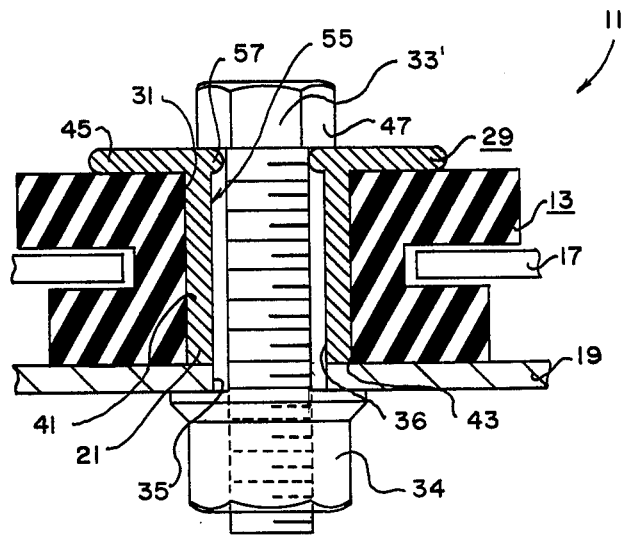

MEANS FOR ESTABLISHING A SUPPORT POST FOR A GROMMET

BACKGROUND OF THE INVENTION

1. Field of the Invention

This invention relates to the field of household electrical appliances, e.g., washers, dryers, refrigerators, air conditioners, and the like, and is particularly directed toward providing a means for establishing a support post for a grommet that is normally used in supporting a vibratable platform upon which is mounted the air compressor or motor and the like of such appliances.

2. Description of the Prior Art

Heretofore, grommets used for this purpose have been supported by incorporating a shoulder bolt or screw, i.e., like that shown in FIG. 7 of the drawings. A common problem in the manufacturing of many designs of shoulder bolts is well known in any industry. In other words, the industry recognizes that shoulder bolts cannot readily be constructed in which the thread structure is uniform all the way up to the shoulder. Moreover, many such designs of shoulder bolts inherently have a condition of thread under size adjacent to the shoulder, or the threads are not rolled up to the shoulder. This thread characteristic causes considerable aggravation when depending upon the shoulder bolt to support a grommet which is used in the manner herein described.

It should be pointed out that in certain uses, this problem can readily be overcome by simply shimming the undersize or partial thread area by incorporating a washer or the like. However, this additional cost nullifies the justification for the expensive one piece shoulder bolt. Thus the undersize or partial thread structure is not relied upon for providing support to the bolt and/or shoulder. On the other hand, a serious problem is encountered when these prior type shoulder bolts (or screws) which have self-threading screws and wherein they are adapted to readily engage relatively thin sheet metal structure. This problem simlply stated is: that the poorly formed threads adjacent the shoulder often cause a spinout. In other words, the larger well-formed thread portion of the bolt first establishes a large diameter pattern in the sheet metal for the threads to engage, but when the shoulder bottoms or the threads adjacent the shoulder engage the sheet metal, the undersize or partial thread structure adjacent the shoulder is brought into play. However, these undersize threads cannot properly grip the sheet metal structure. Thus the bolt becomes ineffective. It is well known to those skilled in the art that this problem is very costly since considerable man hours are lost in the assembly process. Additionally, the sheet metal base pan or plate structure oftentimes must be discarded since the thread structure formed in the sheet metal has been stripped thus rendering it useless.

Therefore, it may readily be seen that thread structure immediately adjacent the shoulder of a shoulder bolt is critical to proper seating of the shoulder upon the sheet metal base pan or plate, i.e., undersize or poorly formed threads in this area cause spinout of the bolt and prohibit tightening the shoulder down onto the base pan or plate.

SUMMARY OF THE INVENTION

The present invention is directed towards overcoming the problems and disadvantages pertaining to utilizing a typical shoulder bolt for supporting a grommet.

An object of this invention is to provide a simple sleeve which may be made from zinc die cast or similar metals, or synthetic resin which when applied to a bolt or screw with pressure can act as a mount point or support for a rubber or synthetic grommet which in turn can support an air compressor or motor power units in various appliances, e.g., washers, dryers, refrigerators, and air conditioners and the like.

Moreover, the problem of undersized or poorly formed threads alluded to above is solved by constructing a bolt body that would be manufactured by using traditional thread rolling equipment, resulting in full body threads, well formed, particularly, in the center of the bolt length. There would be positive presence of threads on the bolt. Using the full threaded bolt would require the above mentioned metal sleeve to be applied over the bolt to achieve the required shoulder location for the rubber grommet. A fully threaded bolt and sleeve sub-assembly would assure positive thread presence, where bolt and sleeve base or terminus meet the sheet metal base pan or plate, thus assuring positive seating and no spinout of the bolt due to undersized threads in this area.

The sleeve abuts or stands upon the base pan or plate which usually is formed from any suitable sheet metal material. The sleeve is drawn tight by the self-tapping screw which threads into an aperture provided in the base plate. The screw/bolt and sleeve sub-assembly, having been pre-pressure fit assembled, is inserted through the grommet (which usually is pre-assembled into a mount support bracket or platform) and the screw-sleeve sub-assembly is then driven or screwed into the aperture provided in the base pan, causing the sleeve to bottom onto the base pan and effect a rigid, secure support post for the grommet to become affixed thereto.

This concept for assembly for grommet support structure is considerably less expensive than using solid shoulder bolts like that shown in FIG. 7. Moreover, it provides more positive thread engagement in the base plate, thus substantially eliminating any need for rejecting base pans or plates when assembling appliances of the nature herein disclosed.

DESCRIPTION OF THE DRAWINGS

FIG. 3 is a side view of a typical self-tapping screw.

FIG. 4 is a side view of the spacer sleeve member of the present invention.

FIG. 5 is a sectional view taken as on the line V—V of FIG. 4.

FIG. 6 is a side view of the sub-assembly of the present invention of which comprises the structure depicted in FIGS. 3 and 4.

FIG. 7 is a side view of a typical solid shoulder bolt of the prior art and which depicts the condition of thread under size or threads not rolled up to the shoulder, thus resulting in partial threads adjacent the shoulder.

FIG. 8 is a view similar to FIG. 2 of an alternate means of securing with a nut and bolt in place of a self tapping screw.

DESCRIPTION OF THE PREFERRED EMBODIMENT

Figure 1:
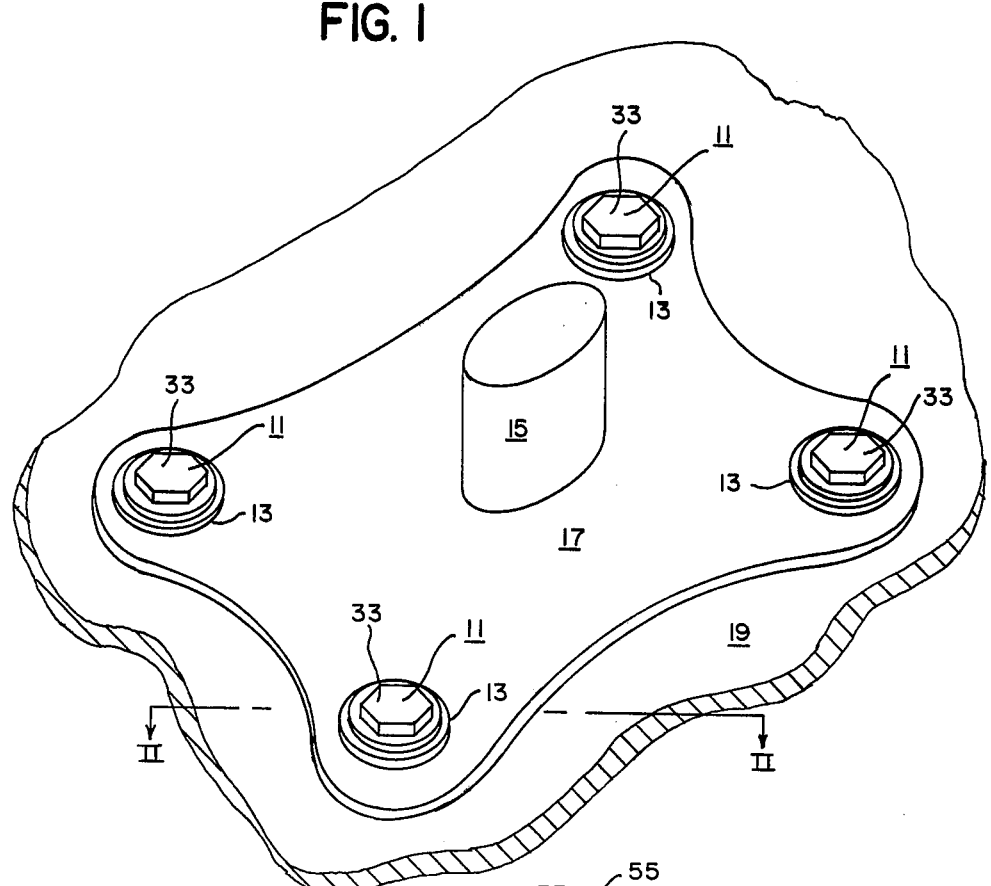
FIG. 1 is a fragmentary perspective view depicting the concept of the present invention in a typical environment, i.e., an air compressor is shown fixedly attached to a vibratable load bracket or platform having four vibration dampener grommets anchoring the platform to a base pan with the attachment means of the present invention establishing a secure support post for each of the grommets to readily become affixed thereto.
Figure 2:
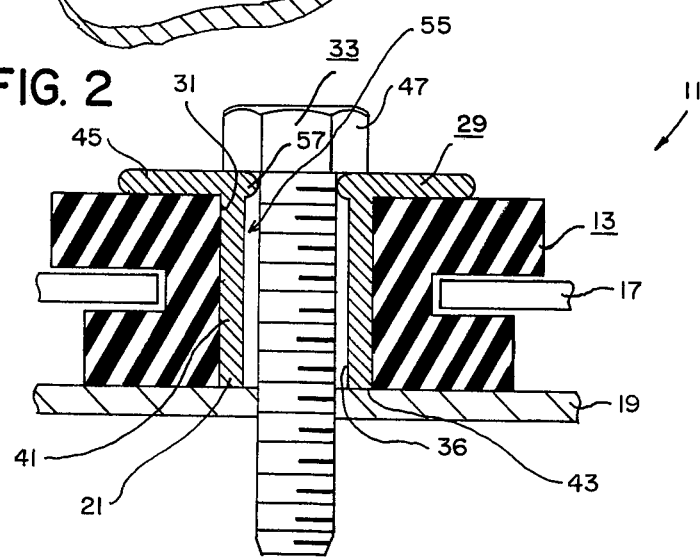
FIG. 2 is an enlarged sectional view taken as on the line II—II of FIG. 1.

The attachment means 11 of the present invention is intended for use in combination with a vibration dampener grommet, as at 13, normally used in various appliances, e.g., washers, dryers, refrigerators, and air conditioners and the like which usually incorporate an air compressor and/or electric powered motor diagrammatically depicted in FIG. 1 and characterized there by the numeral 15. More specifically, the air compressor 15 is usually mounted on a vibratable load bracket, as at 17, wherein a plurality of the vibration dampener grommets 13 are used in anchoring the brackets 17 to a rigid mount base, as at 19, which may alternately be referred to as simply a plate or base pan. Therefore, the attachment means 11 of the present invention is for establishing a secure support post, as shown in FIG. 2 of the drawings by the numeral 21, about which the grommet 13 readily becomes removable affixed.

Particular attention is now directed towards FIG. 7 of the drawings wherein a typical solid shoulder bolt or self tapping shoulder screw 23 is shown. It is well known to those skilled in the art that shoulder bolts or shoulder screws invariably have poorly formed threads, as at 25, immediately adjacent the shoulder, as at 27. In other words, this condition of thread undersized 25 or threads not rolled up to the shoulder 27 is a common problem with many such designs on previous shoulder bolts 23.

On the other hand, due to various reasons, e.g., the underside of the mount base 19 not being readily accessible, etc., it is not desirable to use nuts in securing the should bolts 23. This does not preclude that if accessability were feasiable in design that nuts could not be used in conjunction with the device of FIG. 2 by use of a standard bolt 33' and nut 34 (as shown in FIG. 8) as opposed to a self tapping screw/bolt means 33. In other words, the more accepted practice in the industry heretofore has been to use shoulder bolts/screws 23, as shown in FIG. 7, which are self-tapping. Therefore, this arrangement necessitates that the poorly formed threads be totally depended upon since they are the only threads which ultimately engage the mount base 19. Therefore, threads at the shoulder 27 are critical to seating of the shoulder 27 onto the sheet metal mount base 19. The reasons that these threads are so significant is that undersize or partial threads adjacent the shoulder 27 cause spinout and prohibit tightening of the shoulder bolt 23 down onto the sheet metal mount base 19. In other words, the problem cannot simply be overcome by incorporating washers as is the case when using nuts for properly holding the bolt structure. Thus, there is a need for a shoulder bolt that has substantially perfect threads adjacent to or right up to the shoulder 27.

The above mentioned problem of undersized or poorly formed threads is overcome by the attachment means 11 of the present invention. The attachment means 11 includes a spacer sleeve member, as at 29 in FIGS. 2 and 4 through 6 of the drawings which, as it will be seen, establishes the secure support post 21 alluded to above. The spacer sleeve member 29 is received in a hole, as at 31, which is normally provided in the grommet 13. The attachment means 11 also includes a bolt/screw means, as at 33 in FIGS. 2, 3 and 6 of the drawings, which extends through the spacer sleeve member 29 substantially as shown in FIG. 2 of the drawings. Of course, the rigid mount base 19 is provided with an aperture, as at 35, for properly receiving the bolt/screw means 33. The spacer sleeve member 29 is disposed above the rigid mount base 19 and the grommet 13 and the sleeve member 29 are captured by the bolt/screw means 33. Of course, the sleeve 29 has a bore 36 which is aligned with the aperture 35, although the sleeve rests upon the base 19. Means 33 is then usually threaded through the base plate 19, as shown in FIG. 2.

It should be mentioned at this point that the bolt/screw means is intended to include: (1) bolt structure as shown in FIG. 8, which depends upon the incorporation of a nut 34 or (2) self-tapping screw structure depicted in FIGS. 2, 3 and 6 which properly establishes female threads about the aperture 35 as it captures the grommet 13 and the sleeve member 29. Therefore, the aperture 35' as shown in FIG. 8, of course, allows the bolt 33' shown therein to pass freely therethrough. On the other hand, if the self-tapping bolt/screw means 33 as shown in FIG. 2 were to be used, the aperture 35 would be small enough to enable the self-tapping threads 39 (FIG. 3) to form or cut female threads (not shown) about the aperture 35 in a manner well known to those skilled in the art.

The spacer sleeve member 29 includes a right cylinder-like main body portion, as at 41, having a lowermost terminus, as at 43, for contiguously abutting upon the rigid mount base 19. The spacer sleeve member 29 also includes an uppermost flange portion, as at 45, which is intended to be sandwiched between the grommet 13 and the normal head structure, as at 47, of the bolt/screw means 33. Thus, the grommet 13 and the sleeve member 29 are captured by the bolt/screw means 33 substantially as shown in FIG. 2 of the drawings.

The attachment means 11 preferably includes means generally indicated at 49 in FIG. 5 for enabling the bolt/screw means 33 to be somewhat permanently joined with the spacer sleeve member 29 so as to establish a sub-assembly 51 as depicted in FIG. 6 of the drawing and which is not likely to inadvertently become separated during the handling and shipping process thereof which may occur prior to the ultimate mating of the sub-assembly 51 with the grommet 13.

The means 49 alluded to above for enabling the bolt/screw means 33 and the spacer sleeve member 29 to be somewhat permanently joined one with the other includes providing at least a portion, as at 53, of an inner wall 55 defined by the bore 36 of the sleeve member 29 with a compatibly sized diameter dimension, with respect to the outer diameter of the bolt/screw means 33. Moreover, the diameter of the inner wall 55 and the threads 39 are such that a degree of pressure must be exerted in order to pass bolt/screw means 33 through the sleeve member 29. Thus, inadvertent withdrawal of the bolt/screw means 33 from the sleeve member 29 prior to the ultimate mating of the sub-assembly 51 with the grommet 13 is unlikely.

More specifically, the reduced diameter portion 53 alluded to above preferably is formed so as to establish as least one annular rib means 57 protruding inwardly from the inner wall 55 for circumferentially engaging the bolt/screw means 33. The annular rib means 57 is formed so as to have an inner diameter dimension which is compatibly sized with respect to the diameter of the thread portion 39 of the bolt/screw means 33 whereby a certain degree of force is required to pass the bolt/screw means 33 through the spacer sleeve member 29. Thus, the reduced diameter portion 53 and/or the annular rib means 57 preclude inadvertent withdrawal of the bolt/screw means 33 from the sleeve member 29 prior to the ultimate mating thereof with the grommet 13.

Particular attention is now directed to FIGS. 6 and 7 for the purpose of comparing the difference between the prior art solid shoulder bolt 23 and the sub-assembly 51. The improved thread structure, as at 59, of the sub-assembly 51 is truly remarkable. This improved thread structure 59 is, of course, possible since the thread structure 59 was not formed, i.e., in the manufacturing process of the bolt/screw means 33, up close to an existing shoulder, but rather was formed at the middle of the bolt/screw means 33, or as at 59 in in FIG. 3. Therefore, substantially perfect threads 59 can now be depended upon for engagement with the aperture 35. Moreover, the bolt/screw means 33 does not spin out as it is having the proper torque applied thereto. Thus, the aggravation of spinout and the stripped apertures 35 are now obviated. In addition, the cost of replacing the damaged rigid mount base 19 is precluded.

The sub-assembly 51 is intended to be built up at a point of manufacture which is remote from the point of manufacture for the appliance or the like that incorporates the motor 15. Therefore, the sub-assembly 51 may be handled point to point in like manner as the shoulder bolt 23 with absolute assurance that the sub-assembly 51 does not become dismembered.

It should also be pointed out that the bolt/screw means 33 as shown in FIG. 3 and the sleeve member 29 as shown in FIG. 5 are not necessarily compatibly scaled in accordance with the above disclosure, i.e., the mating relationship thereof is not intended to be depicted in proper scale.

The spacer sleeve member 29 may be formed from a relatively soft metallic substance, e.g., zinc die cast or similar materials, in a manner well known to those skilled in the art and as shown in cross-section in FIG. 2 of the drawings.

On the other hand, the spacer sleeve member 29 may optionally be formed from a synthetic resin substance in a manner well known to those skilled in the art and as shown in cross-section in FIG. 5 of the drawings.

Therefore, it can be concluded that the sub-assembly 51 is superior to the solid shoulder bolt 23 in many ways, for example:

(1) The threads 59 are substantially perfect while the threads 25 are totally unsatisfactory.

(2) The cost of manufacturing the sub-assembly 51 is much less than for the solid shoulder bolt 23.

(3) The cost of the sub-assembly 51 can be even further reduced by constructing the sleeve member 29 from a synthetic resin substance.

While the present invention has been described and illustrated with respect to preferred embodiments thereof, it is not intended to be so limited since changes and modifications may be made therein which are within the full intended scope of the invention.

I claim:

1. The combination with a vibration dampener grommet normally used in anchoring a vibratable load bracket to a rigid mount base, of attachment means for establishing a secure support post about which said grommet readily becomes removably affixed; said attachment means comprising a spacer sleeve member which is received in a hole normally provided in said grommet, and screw means extending through said spacer sleeve member, said screw means having a head structure; said rigid mount base being provided with an aperture for properly receiving said screw means with said spacer sleeve member being abutted upon said rigid mount base; said spacer sleeve member including a right cylinderlike main body portion having a lowermost terminus for contiguously abutting upon said rigid mount base and an uppermost flange portion intended to be sandwiched between said grommet and said head structure of said screw means, thus said grommet and said sleeve member are captured by said screw means; said main body portion having an inner wall and having rib means protruding inwardly from said inner wall for circumferentially engaging said screw means, said rib means defining an inner diameter dimension which is compatibly sized with respect to the diameter of the threaded portion of said screw means whereby a certain degree of force is required to pass said screw means through said spacer sleeve member, thus the inadvertent withdrawal of said screw means from said sleeve member prior to the ultimate mating thereof with said grommet is unlikely.

2. The combination as set forth in claim 1 in which said rib means includes at least one annular rib means protruding inwardly from said inner wall of said right cylinderlike main body portion of said space sleeve member for circumferentially engaging said screw means, said annular rib means having an inner diameter dimension which is compatibly sized with respect to the diameter of the threaded portion of said screw means whereby a certain degree of force is required to pass said screw means through said spacer sleeve member, thus inadvertent withdrawal of said screw means from said sleeve member prior to the ultimate mating thereof with said grommet is unlikely.

3. The combination as set forth in claim 2 in which said spacer sleeve member is formed from a relatively soft metallic substance.

4. The combination as set forth in claim 2 in which said spacer sleeve member is formed from zinc die-cast metal.

5. The combination as set forth in claim 2 in which said spacer sleeve member is formed from a synthetic resin substance.

6. The combination of claim 1 in which said right cylinderlike main body portion of said spacer sleeve means and said rib means are constructed as an integral, one-piece unit.

* * * * *